UNITED STATES PATENT OFFICE.

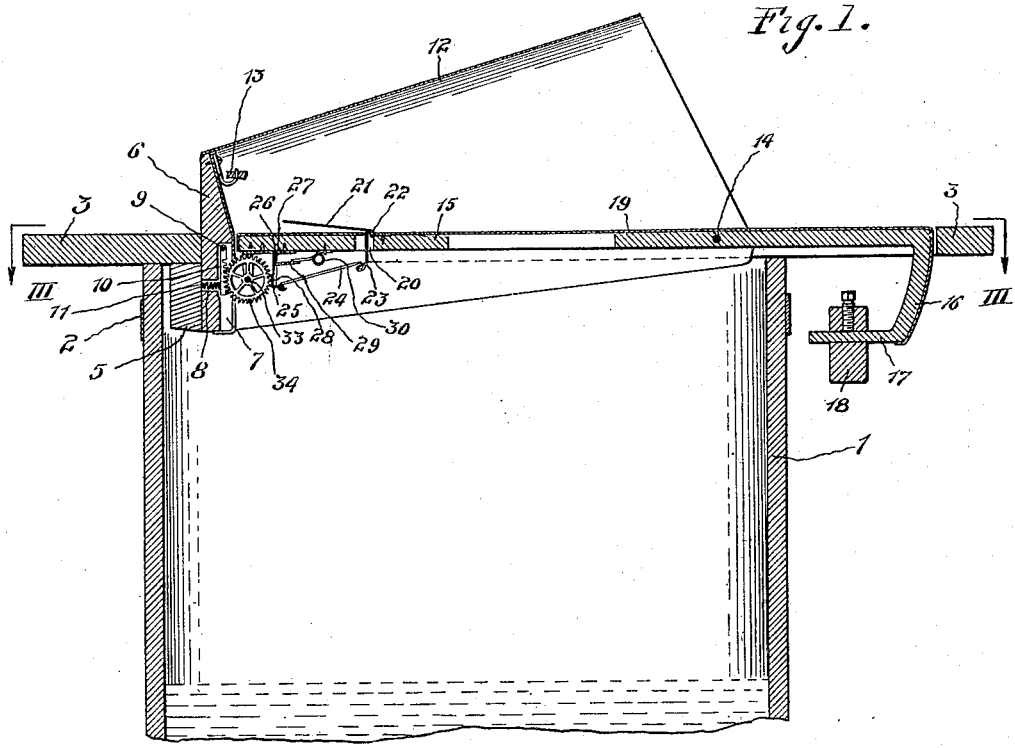
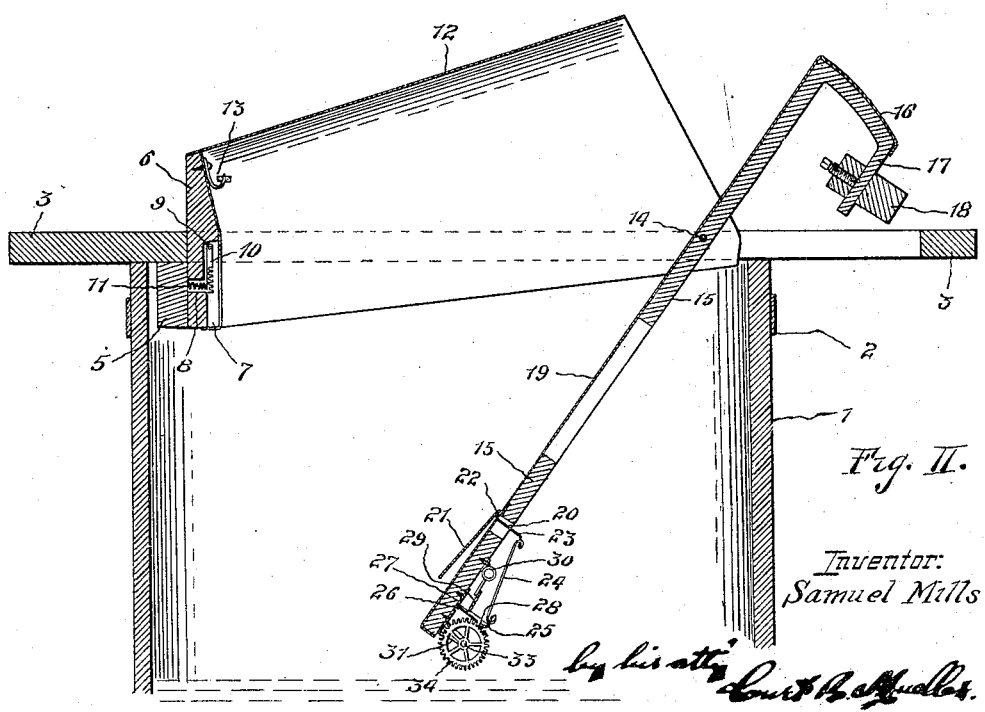

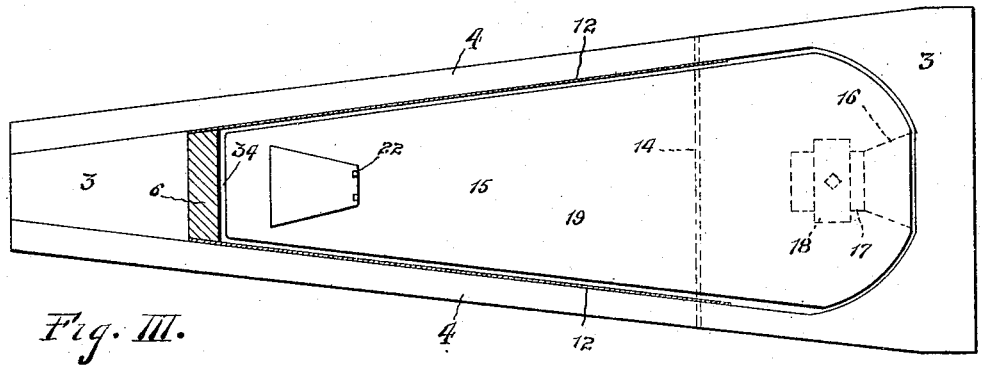
Fig. III.
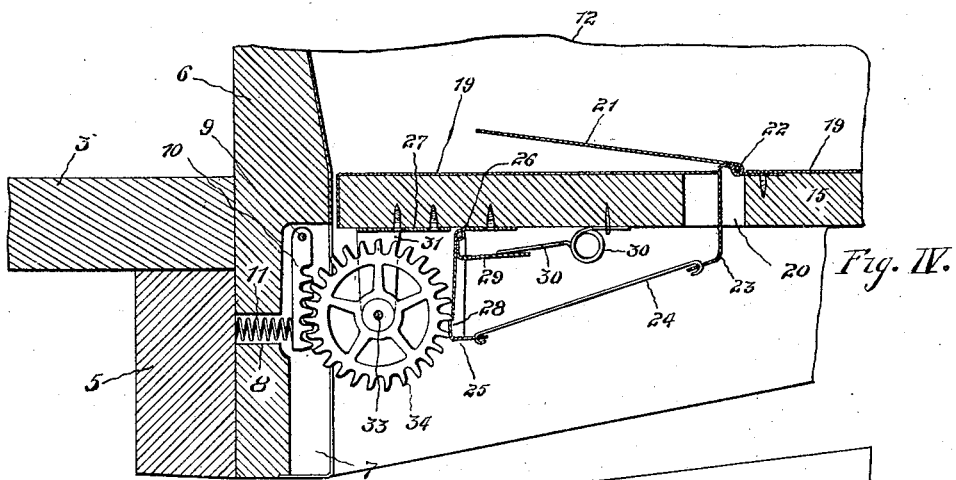
Fig. IV.
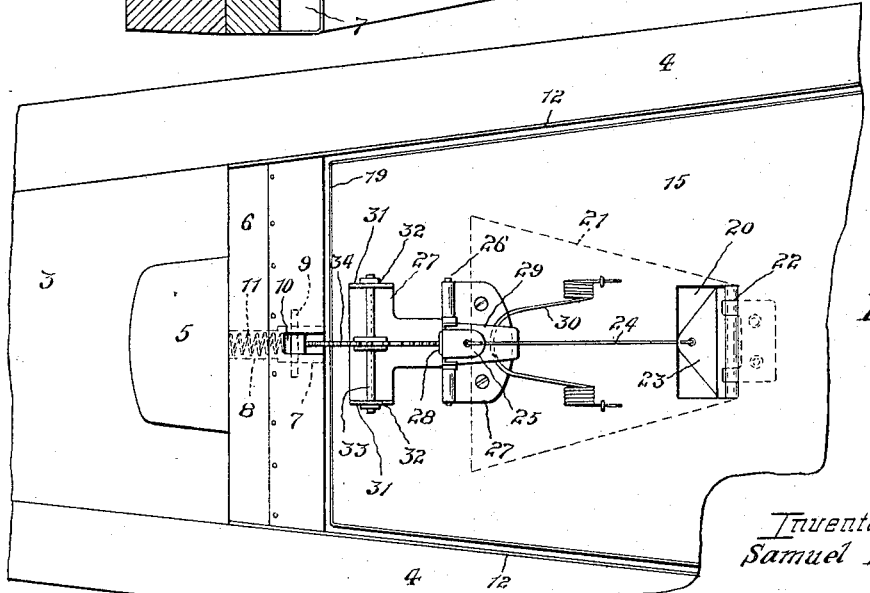
Fig. V.
Inventor:
Samuel Mills

SAMUEL MILLS, OF CLEVELAND, OHIO.

RODENT-TRAP.

1,204,472.   Specification of Letters Patent.   Patented Nov. 14, 1916.

Application filed January 22, 1916. Serial No. 73,516.

*To all whom it may concern:*

Be it known that I, SAMUEL MILLS, a citizen of the United States, residing at Cleveland, in the county of Cuyahoga and State of Ohio, have invented a new and useful Improvement in Rodent-Traps, of which the following is a specification, the principle of the invention being herein explained and the best mode in which I have contemplated applying that principle, so as to distinguish it from other inventions.

My invention relates to a rodent trap and more particularly to a device of this character adapted automatically to reset itself.

The object of this invention is provision of a trap which will be positive yet delicate in its operation and which will be sufficiently economical of manufacture for use where rats or other obnoxious rodents abound.

With the foregoing and other objects in view the invention consists of the novel construction, combination and arrangement of parts as hereinafter more specifically described and illustrated in the accompanying drawings, wherein is shown preferred and modified embodiments of the invention, but it is to be understood that many other changes, variations and modifications can be resorted to which come within the scope of the claims hereunto appended.

Adverting to the drawings, Figure I is a vertical section of a trap embodying my invention associated with a water container and showing the trap in its set position. Fig. II is a similar view with certain parts in an altered position as assumed when the trap is sprung. Fig. III is a section on line III—III of Fig. I looking downwardly. Fig. IV is an enlarged view of certain details shown in Fig. I. Fig. V is a bottom plan of Fig. IV.

While the drawings illustrate my trap employed in conjunction with an ordinary barrel in which water may or may not be contained it is evident that the character of the receptacle for catching the rodents may be anything else suited to the purpose intended. The structure shown includes a barrel 1 provided with hoops 2 and an open top across which a supporting frame 3 is adapted to rest. This frame includes a pair of converging side members 4 and depending block 5 and another block 6 abutting the other and extending upwardly a given distance above the frame 3. As appears in Figs. II and V the block 6 is provided with an upwardly extending recess 7 and a bore 8 opening into the same. Secured so as to extend across the recess 7 is a pin 9 upon which a locking rack 10 is pivotally suspended. This rack is normally held in a predetermined position of rest by a compression spring 11 which occupies the bore 8. The purpose of the locking rack 10 will be hereinafter explained. Surmounted over the frame 3 is a funnel shaped hood 12 the smaller end of which abuts against the block 6 to form a closed end. At some suitable point within this closed end and upon the block 6 a bait 13 is located.

Pivotally mounted at 14 between the sides 4 of the frame is a member 15 adapted to swing downwardly toward the position in which it appears in Fig. II. That end of the swinging member 15 which is located outside of the hood 12 is curved downwardly at 16 and thereafter backwardly or in a direction toward its other free end at 17 at which point it carries a counterweight 18 adapted to be adjusted therealong. If the swinging member 15 is made of wood the upper surface thereof is preferably metal coated as with tin 19 in order to preclude a sustaining or saving clutch against its surface by the claws of the rodent. The member 15, in the exemplification shown, is provided with an aperture 20 to permit of the movement of trip 21 which is hinged to one side thereof at 22 as clearly appears in Fig. IV. The trip 21 extends an appropriate distance from the hinge 22 in a direction toward the closed end of the hood 12 whereby the required leverage is attained. Depending as an integral element is an extension 23 with which a hook 24 articulates. The other end of the hook 24 articulates with a catch 25 hinged at 26 to a stamping 27 which is secured to the end surface of the member 15 by means of a series of screws likewise clearly seen in Fig. IV. The catch 25 is fashioned with an offset 28 adapted to act as a detent in a manner to be presently described. The catch 25 furthermore carries on its opposite side an extension 29 which is engaged by a double torsion spring 30 arranged to bear downwardly upon it to throw the catch 25 in a direction toward the rack 10 thus drawing the hook 24 and extension 23 along with it to normally maintain the trip 21 in its elevated or inclined position.

Depending from the stamping 27 between the positions of the rack 10 and the catch 25 are a pair of brackets 31 provided with alined bearings 32 in which a pin 33 is mounted. Rotatably supported upon the pin 33 is a ratchet wheel 34 adapted to engage the rack 10 and in turn be engaged by the offset 28 of the catch 25. The heft and disposition of the counterweight 18 is to be so adjusted that the other free end of the swinging member 15 is normally held in its uppermost position or that shown in Fig. I at which time the ratchet wheel 34 is prevented from turning because of the engagement therewith of the rack 10 on one side and the catch 25 on the other.

A rodent on sniffing the bait is tempted to enter the hood 12 and presently advances along the trip 21 until the major portion of its weight at its haunches causes a depression of the trip against the action of the spring 30 to thereby release one side of the wheel 34 from the detent 28 and thus permit the wheel to roll upon the rack 10 and spring the trap by permitting the member 15 to swing downwardly and thereby compel the rodent to drop into the barrel. Directly thereafter, owing to the release of weight, the wheel 34 is again elevated and brought to rest in a position above the detent 28.

I desire to specify the advantage of employing a ratchet wheel 34 in the manner shown. Owing to the fact that one-half of the actual weight of the rodent is sustained by the rack and one-half by the detent 28 the withdrawal of the latter is more easily accomplished and the trap thereby made correspondingly sensitive or more delicate in its operation. Another feature resides in constricting the area from which the scent of the bait may be obtained to thereby concentrate the alluring odor of the same and furthermore the quantity of bait may be considerably in excess of that usually used because practice has demonstrated that but little if any is removed by the animal or animals which have been caught. The purpose of the spring 11 is to insure against a sticking of the parts during the automatic reset by always forcing the teeth of the rack past the tips of the ratchet wheel. If desired a spring or some other equivalent means for accomplishing the automatic resetting movement could be substituted for the counterweight.

I claim:

1. A rodent trap comprising an open receptacle, a swinging frame mounted over the opening thereof, a rack, a ratchet wheel carried by said frame and adapted to roll on said rack, a trip, means yieldingly connected therewith and normally engaging said wheel on the side opposite said rack whereby to lock the frame against movement, said trip being adapted and arranged to be operated by the weight of a rodent to suddenly release the engagement with one side of said wheel.

2. A device of the character described comprising a support, a member adapted to swing thereon, a yielding detent, a ratchet wheel carried by said member and adapted to come into engagement with said detent, a trip carried by said member, means yieldingly connected therewith and normally engaging said wheel on the side opposite said detent whereby to lock said wheel against rotation in coaction with said detent, the arrangement being such that a delicate actuation of said trip releases one side of said wheel to enable it to roll upon said detent in response to a gravitational fall of said member.

Signed by me this 14th day of January, 1916.

SAMUEL MILLS.

Copies of this patent may be obtained for five cents each, by addressing the "Commissioner of Patents, Washington, D. C."